(12) United States Patent
Sekine et al.

(10) Patent No.: US 12,050,307 B2
(45) Date of Patent: Jul. 30, 2024

(54) IMAGING LENS INCLUDING SEVEN LENSES OF ++−++−− OR ++−+++− REFRACTIVE POWERS

(71) Applicant: TOKYO VISIONARY OPTICS CO., LTD., Tokyo (JP)

(72) Inventors: Yukio Sekine, Tokyo (JP); Ruidong Yang, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 357 days.

(21) Appl. No.: 17/406,811

(22) Filed: Aug. 19, 2021

(65) Prior Publication Data
US 2022/0179179 A1   Jun. 9, 2022

(30) Foreign Application Priority Data
Aug. 19, 2020  (JP) .............................. JP2020-138624

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2020/0409060 A1 | 12/2020 | Oinuma et al. |
| 2022/0003964 A1* | 1/2022 | Xie .......................... G02B 9/64 |

FOREIGN PATENT DOCUMENTS

CN           110346902 A    10/2019

* cited by examiner

*Primary Examiner* — Wen Huang
(74) *Attorney, Agent, or Firm* — Maine Cernota & Curran

(57) ABSTRACT

There is provided an imaging lens with excellent optical characteristics which satisfies demand of a low profile and a low F-number. An imaging lens comprises in order from an object side to an image side, a first lens with positive refractive power, a second lens with positive refractive power, a third lens with negative refractive power, a fourth lens with positive refractive power, a fifth lens with positive refractive power, a sixth lens, and a seventh lens with negative refractive power, wherein said first lens has an object-side surface being convex in a paraxial region, said second lens has an image-side surface being convex in a paraxial region, said third lens has an object-side surface being concave in a paraxial region, said fourth lens has an object-side surface being concave in a paraxial region, said sixth lens has an object-side surface being convex in a paraxial region, and said seventh lens has an image-side surface being concave in a paraxial region.

7 Claims, 6 Drawing Sheets

IMAGING LENS INCLUDING SEVEN LENSES OF ++−++−− OR ++−+++− REFRACTIVE POWERS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN110346902A) discloses an imaging lens comprising, in order from an object side, a first lens, a second lens, a third lens, a fourth lens, a fifth lens, a sixth lens, and a seventh lens, and a relationship between a focal length of the first lens and a focal length of the overall optical system, a refractive index of the second lens, a relationship between a focal length of the third lens and a focal length of the fourth lens, a relationship between a paraxial curvature radius of an object-side surface of the seventh lens and a paraxial curvature radius of an image-side surface of the seventh lens, and a refractive index of the fifth lens satisfy a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (surface being convex)", "a concave surface (surface being concave)" or "a flat surface (surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" are distances obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power, a second lens with positive refractive power, a third lens with negative refractive power, a fourth lens with positive refractive power, a fifth lens with positive refractive power, a sixth lens, and a seventh lens with negative refractive power, wherein said first lens has an object-side surface being convex in a paraxial region, said second lens has an image-side surface being convex in a paraxial region, said third lens has an object-side surface being concave in a paraxial region, said fourth lens has an object-side surface being concave in a paraxial region, said sixth lens has an object-side surface being convex in a paraxial region, and said seventh lens has an image-side surface being concave in a paraxial region.

The first lens has the positive refractive power, aspheric surfaces on both sides, and the object-side surface being convex in the paraxial region. Therefore, spherical aberration, coma aberration, astigmatism, field curvature, and distortion are suppressed.

The second lens has the positive refractive power, aspheric surfaces on both sides, and the image-side surface being convex in the paraxial region. Therefore, reduction in a profile is achieved, and the spherical aberration, the astigmatism, the field curvature, and the distortion are properly corrected.

The third lens has the negative refractive power, aspheric surfaces on both sides, and the object-side surface being concave in the paraxial region. Therefore, chromatic aberration, the coma aberration, the astigmatism, the field curvature, and the distortion are properly corrected.

The fourth lens has the positive refractive power, aspheric surfaces on both sides, and the object-side surface being concave in the paraxial region. Therefore, the coma aberration, the astigmatism, the field curvature, and the distortion are properly corrected.

The fifth lens has the positive refractive power, and aspheric surfaces on both sides. Therefore, the astigmatism, the field curvature, and the distortion are properly corrected.

The sixth lens has aspheric surfaces on both sides and the object-side surface being convex in the paraxial region. Therefore, the astigmatism, the field curvature, and the distortion are properly corrected.

The seventh lens has negative refractive power and aspheric surfaces on both sides. Therefore, the chromatic aberration, the astigmatism, the field curvature, and the distortion are properly corrected. Furthermore, the seventh lens has the image-side surface being concave in the paraxial region, a low profile is maintained and a back focus is secured.

According to the imaging lens having the above-described configuration, it is preferable that an object-side surface of the second lens is formed as an aspheric surface having at least one pole point in a position off the optical axis.

When the object-side surface of the second lens is formed as the aspheric surface having at least one pole point in the position off the optical axis, the astigmatism, the field curvature, and the distortion can be more properly corrected.

According to the imaging lens having the above-described configuration, it is preferable that an object-side surface of the fifth lens is convex in the paraxial region.

When the object-side surface of the fifth lens is convex in the paraxial region, the astigmatism, the field curvature, and the distortion can be properly corrected.

According to the imaging lens having the above-described configuration, it is preferable that the object-side surface of the fifth lens is formed as an aspheric surface having at least one pole point in a position off the optical axis.

When the object-side surface of the fifth lens is formed as the aspheric surface having at least one pole point in the position off the optical axis, the astigmatism, the field curvature, and the distortion can be more properly corrected.

According to the imaging lens having the above-described configuration, it is preferable that an image-side surface of the fifth lens is formed as an aspheric surface having at least one pole point in a position off the optical axis.

When the image-side surface of the fifth lens is formed as the aspheric surface having at least one pole point in the position off the optical axis, the astigmatism, the field curvature, and the distortion can be more properly corrected.

According to the imaging lens having the above-described configuration, it is preferable that an object-side surface of the seventh lens is convex in the paraxial region.

When the object-side surface of the seventh lens is convex in the paraxial region, the astigmatism, the field curvature, and the distortion can be properly corrected.

According to the imaging lens having the above-described configuration, it is preferable that the object-side surface of the seventh lens is formed as an aspheric surface having at least one pole point in a position off the optical axis.

When the object-side surface of the seventh lens is formed as the aspheric surface having at least one pole point in the position off the optical axis, the astigmatism, the field curvature, and the distortion can be more properly corrected.

According to the imaging lens having the above-described configuration, it is preferable that the image-side surface of the seventh lens is formed as an aspheric surface having at least one pole point in a position off the optical axis.

When the image-side surface of the seventh lens is formed as the aspheric surface having at least one pole point in the position off the optical axis, the astigmatism, the field curvature, and the distortion can be more properly corrected.

The imaging lens according to the present invention, due to the above-mentioned configuration, achieves a low profile which a ratio of a total track length to a diagonal length of an effective image area of the image sensor is 0.60 or less and a low F number of 2.1 or less.

According to the imaging lens having the above-described configuration, it is preferable that the following conditional expression (1) is satisfied:

$$0.02 < (D6/|f6|) \times 100 < 2.55 \qquad (1)$$

where

D6: a thickness along the optical axis of the sixth lens, and f6: a focal length of the sixth lens.

The conditional expression (1) defines an appropriate range of a relationship between the thickness along the optical axis of the sixth lens and the focal length of the sixth lens. By satisfying the conditional expression (1), reduction in the profile can be achieved, and the astigmatism, the field curvature, and the distortion can be properly corrected.

According to the imaging lens having the above-described configuration, it is preferable that the following conditional expression (2) is satisfied:

$$0.50 < f1/f < 1.70 \qquad (2)$$

where f1: a focal length of the first lens, and f: a focal length of the overall optical system of the imaging lens.

The conditional expression (2) defines an appropriate range of the focal length of the first lens. By satisfying the conditional expression (2), the spherical aberration, the coma aberration, the astigmatism, the field curvature, and the distortion can be properly corrected.

According to the imaging lens having the above-described configuration, it is preferable that the following conditional expression (3) is satisfied:

$$3.75 < f5/f < 17.50 \qquad (3)$$

where f5: a focal length of the fifth lens, and f: a focal length of the overall optical system of the imaging lens.

The conditional expression (3) defines an appropriate range of the focal length of the fifth lens. By satisfying the conditional expression (3), the astigmatism, the field curvature, and the distortion can be properly corrected.

According to the imaging lens having the above-described configuration, it is preferable that the following conditional expression (4) is satisfied:

$$0.20 < (f1/|f6|) \times 100 < 35.00 \qquad (4)$$

where f1: a focal length of the first lens, and f6: a focal length of the sixth lens.

The conditional expression (4) defines an appropriate range of a relationship between the focal length of the first lens and the focal length of the sixth lens. By satisfying the conditional expression (4), the astigmatism, the field curvature, and the distortion can be properly corrected.

According to the imaging lens having the above-described configuration, it is preferable that the following conditional expression (5) is satisfied:

$$0.60 < r13/f < 3.50 \qquad (5)$$

where r13: a paraxial curvature radius of an object-side surface of the seventh lens, and f: a focal length of the overall optical system of the imaging lens.

The conditional expression (5) defines an appropriate range of the paraxial curvature radius of the object-side surface of the seventh lens. By satisfying the conditional expression (5), the astigmatism, the field curvature, and the distortion can be properly corrected.

According to the imaging lens having the above-described configuration, it is preferable that the following conditional expression (6) is satisfied:

$$13.00 < vd4 < 26.00 \qquad (6)$$

where vd4: an abbe number at d-ray of the fourth lens.

The conditional expression (6) defines an appropriate range of the abbe number at d-ray of the fourth lens. By satisfying the conditional expression (6), the chromatic aberration can be properly corrected.

According to the imaging lens having the above-described configuration, it is preferable that the following conditional expression (7) is satisfied:

$$19.00 < vd6 < 37.00 \qquad (7)$$

where vd6: an abbe number at d-ray of the sixth lens.

The conditional expression (7) defines an appropriate range of the abbe number at d-ray of the sixth lens. By satisfying the conditional expression (7), the chromatic aberration can be properly corrected.

According to the imaging lens having the above-described configuration, it is preferable that the following conditional expression (8) is satisfied:

$$3.50 < (vd2/vd4) \times (vd5/vd6) < 7.50 \quad (8)$$

where
vd2: an abbe number at d-ray of the second lens,
vd4: an abbe number at d-ray of the fourth lens,
vd5: an abbe number at d-ray of the fifth lens, and
vd6: an abbe number at d-ray of the sixth lens.

The conditional expression (8) defines an appropriate range of a relationship among the abbe number at d-ray of the second lens, the abbe number at d-ray of the fourth lens, the abbe number at d-ray of the fifth lens, and the abbe number at d-ray of the sixth lens. By satisfying the conditional expression (8), the chromatic aberration can be properly corrected.

According to the imaging lens having the above-described configuration, it is preferable that the following conditional expression (9) is satisfied:

$$1.50 < r3/f < 6.00 \quad (9)$$

where
r3: a paraxial curvature radius of an object-side surface of the second lens, and
f: a focal length of the overall optical system of the imaging lens.

The conditional expression (9) defines an appropriate range of the paraxial curvature radius of the object-side surface of the second lens. By satisfying the conditional expression (9), the astigmatism, the field curvature, and the distortion can be properly corrected.

According to the imaging lens having the above-described configuration, it is preferable that the following conditional expression (10) is satisfied:

$$-1.55 < r4/f < -0.40 \quad (10)$$

where
r4: a paraxial curvature radius of an image-side surface of the second lens, and
f: a focal length of the overall optical system of the imaging lens.

The conditional expression (10) defines an appropriate range of the paraxial curvature radius of the image-side surface of the second lens. By satisfying the conditional expression (10), the spherical aberration, the astigmatism, the field curvature, and the distortion can be properly corrected.

According to the imaging lens having the above-described configuration, it is preferable that the following conditional expression (11) is satisfied:

$$-3.00 < r5/f < -0.50 \quad (11)$$

where
r5: a paraxial curvature radius of an object-side surface of the third lens, and
f: a focal length of the overall optical system of the imaging lens.

The conditional expression (11) defines an appropriate range of the paraxial curvature radius of the object-side surface of the third lens. By satisfying the conditional expression (11), the coma aberration, the astigmatism, and the distortion can be properly corrected.

According to the imaging lens having the above-described configuration, it is preferable that the following conditional expression (12) is satisfied:

$$7.00 < |r6|/f \quad (12)$$

where
r6: a paraxial curvature radius of an image-side surface of the third lens, and
f: a focal length of the overall optical system of the imaging lens.

The conditional expression (12) defines an appropriate range of the paraxial curvature radius of the image-side surface of the third lens. By satisfying the conditional expression (12), the astigmatism, the field curvature, and the distortion can be properly corrected.

According to the imaging lens having the above-described configuration, it is preferable that the following conditional expression (13) is satisfied:

$$-5.00 < r7/f < -0.50 \quad (13)$$

where
r7: a paraxial curvature radius of an object-side surface of the fourth lens, and
f: a focal length of the overall optical system of the imaging lens.

The conditional expression (13) defines an appropriate range of the paraxial curvature radius of the object-side surface of the fourth lens. By satisfying the conditional expression (13), the coma aberration, the astigmatism, and the distortion can be properly corrected.

According to the imaging lens having the above-described configuration, it is preferable that the following conditional expression (14) is satisfied:

$$-3.00 < r8/f < -0.40 \quad (14)$$

where
r8: a paraxial curvature radius of an image-side surface of the fourth lens, and
f: a focal length of the overall optical system of the imaging lens.

The conditional expression (14) defines an appropriate range of the paraxial curvature radius of the image-side surface of the fourth lens. By satisfying the conditional expression (14), the coma aberration, the astigmatism, and the distortion can be properly corrected.

According to the imaging lens having the above-described configuration, it is preferable that the following conditional expression (15) is satisfied:

$$1.30 < |r9|/f < 10.50 \quad (15)$$

where
r9: a paraxial curvature radius of an object-side surface of the fifth lens, and
f: a focal length of the overall optical system of the imaging lens.

The conditional expression (15) defines an appropriate range of the paraxial curvature radius of the object-side surface of the fifth lens. By satisfying the conditional expression (15), the astigmatism, the field curvature, and the distortion can be properly corrected.

According to the imaging lens having the above-described configuration, it is preferable that the following conditional expression (16) is satisfied:

$$2.00 < |r10|/f < 12.00 \quad (16)$$

where
r10: a paraxial curvature radius of an image-side surface of the fifth lens, and
f: a focal length of the overall optical system of the imaging lens.

The conditional expression (16) defines an appropriate range of the paraxial curvature radius of the image-side surface of the fifth lens. By satisfying the conditional expression (16), the astigmatism, the field curvature, and the distortion can be properly corrected.

According to the imaging lens having the above-described configuration, it is preferable that the following conditional expression (17) is satisfied:

$$0.85 < r12/f < 2.00 \tag{17}$$

where r12: a paraxial curvature radius of an image-side surface of the sixth lens, and f: a focal length of the overall optical system of the imaging lens.

The conditional expression (17) defines an appropriate range of the paraxial curvature radius of the image-side surface of the sixth lens. By satisfying the conditional expression (17), the astigmatism, the field curvature, and the distortion can be properly corrected.

According to the imaging lens having the above-described configuration, it is preferable that the following conditional expression (18) is satisfied:

$$-25.00 < |r6|/r7 < -0.30 \tag{18}$$

where r6: a paraxial curvature radius of an image-side surface of the third lens, and r7: a paraxial curvature radius of an object-side surface of the fourth lens.

The conditional expression (18) defines an appropriate range of a relationship between the paraxial curvature radius of the image-side surface of the third lens and the paraxial curvature radius of the object-side surface of the fourth lens. By satisfying the conditional expression (18), the coma aberration, the astigmatism, the field curvature, and the distortion can be properly corrected.

According to the imaging lens having the above-described configuration, it is preferable that the following conditional expression (19) is satisfied:

$$0.20 < r12/r13 < 1.40 \tag{19}$$

where r12: a paraxial curvature radius of an image-side surface of the sixth lens, and r13: a paraxial curvature radius of an object-side surface of the seventh lens.

The conditional expression (19) defines an appropriate range of a relationship between the paraxial curvature radius of the image-side surface of the sixth lens and the paraxial curvature radius of the object-side surface of the seventh lens. By satisfying the conditional expression (19), the astigmatism, the field curvature, and the distortion can be properly corrected.

According to the imaging lens having the above-described configuration, it is preferable that the following conditional expression (20) is satisfied:

$$-3.50 < r13/f7 < -0.65 \tag{20}$$

where r13: a paraxial curvature radius of an object-side surface of the seventh lens, and f7: a focal length of the seventh lens.

The conditional expression (20) defines an appropriate range of a relationship between the paraxial curvature radius of the object-side surface of the seventh lens and the focal length of the seventh lens. By satisfying the conditional expression (20), the chromatic aberration, the astigmatism, the field curvature, and the distortion can be properly corrected.

According to the imaging lens having the above-described configuration, it is preferable that the following conditional expression (21) is satisfied:

$$8.75 < f2/D2 < 20.00 \tag{21}$$

where f2: a focal length of the second lens, and

D2: a thickness along the optical axis of the second lens.

The conditional expression (21) defines an appropriate range of a relationship between the focal length of the second lens and the thickness along the optical axis of the second lens. By satisfying the conditional expression (21), reduction in the profile can be achieved, and the spherical aberration, the astigmatism, the field curvature, and the distortion can be properly corrected.

According to the imaging lens having the above-described configuration, it is preferable that the following conditional expression (22) is satisfied:

$$-17.00 < f5/f7 < -2.50 \tag{22}$$

where f5: a focal length of the fifth lens, and f7: a focal length of the seventh lens.

The conditional expression (22) defines an appropriate range of a relationship between the focal length of the fifth lens and the focal length of the seventh lens. By satisfying the conditional expression (22), the chromatic aberration, the spherical aberration, the astigmatism, the field curvature, and the distortion can be properly corrected.

According to the imaging lens having the above-described configuration, it is preferable that the following conditional expression (23) is satisfied:

$$-0.60 < f4/f5/f7 < -0.04 \tag{23}$$

where f4: a focal length of the fourth lens, f5: a focal length of the fifth lens, and f7: a focal length of the seventh lens.

The conditional expression (23) defines an appropriate range of a relationship among the focal length of the fourth lens, the focal length of the fifth lens, and the focal length of the seventh lens. By satisfying the conditional expression (23), reduction in the profile can be achieved, and the chromatic aberration, the spherical aberration, the coma aberration, the astigmatism, the field curvature, and the distortion can be properly corrected.

According to the imaging lens having the above-described configuration, it is preferable that the following conditional expression (24) is satisfied:

$$3.60 < |f6|/f \tag{24}$$

where f6: a focal length of the sixth lens, and f: a focal length of the overall optical system of the imaging lens.

The conditional expression (24) defines an appropriate range of the focal length of the sixth lens. By satisfying the conditional expression (24), the astigmatism, the field curvature, and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7 and 9 are schematic views of the imaging lenses in Examples 1 to 5 according to the embodiments of the present invention, respectively. The preferred embodiment of the present invention will be described in detail below referring to FIG. 1.

Figure 1:
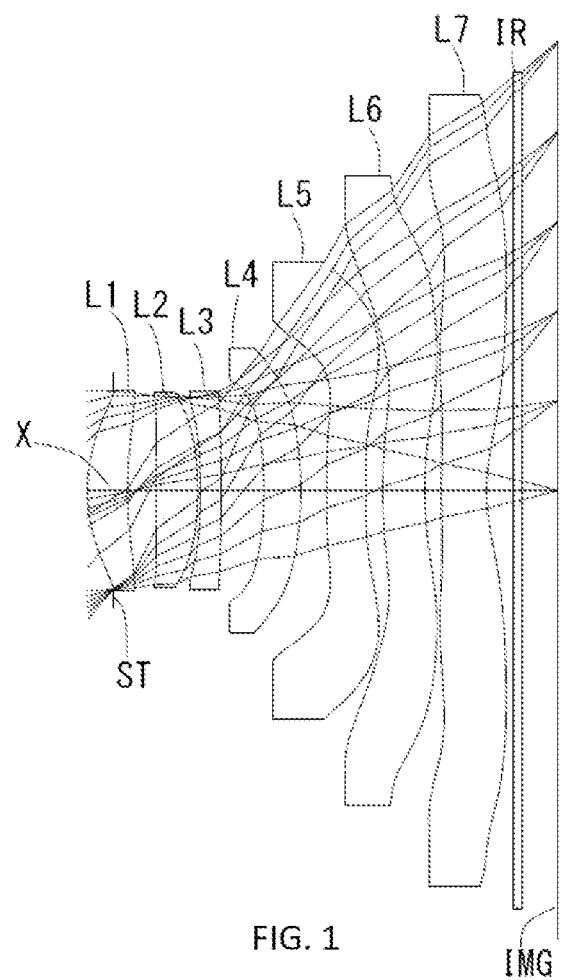
FIG. 1 is a schematic view showing an imaging lens in Example 1 according to the present invention.

As shown in FIG. 1, the imaging lens according to the present invention comprises, in order from an object side to an image side, a first lens L1 with positive refractive power, a second lens L2 with positive refractive power, a third lens L3 with negative refractive power, a fourth lens L4 with positive refractive power, a fifth lens L5 with positive refractive power, a sixth lens L6, and a seventh lens L7 with negative refractive power, wherein said first lens L1 has an object-side surface being convex in a paraxial region, said second lens L2 has an image-side surface being convex in a paraxial region, said third lens L3 has an object-side surface being concave in a paraxial region, said fourth lens L4 has an object-side surface being concave in a paraxial region, said sixth lens L6 has an object-side surface being convex in a paraxial region, and said seventh lens L7 has an image-side surface being concave in a paraxial region.

A filter IR such as an IR cut filter or a cover glass is arranged between the seventh lens L7 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a meniscus shape having the object-side surface being convex and an image-side surface being concave in the paraxial region (near the optical axis X). Furthermore, both sides of the first lens L1 are formed as aspheric surfaces. Therefore, spherical aberration, coma aberration, astigmatism, field curvature, and distortion are suppressed.

The second lens L2 has the positive refractive power and is formed in a biconvex shape having the object-side surface being convex and an image-side surface being convex in the paraxial region. Furthermore, both sides of the second lens L2 are formed as aspheric surfaces. Therefore, reduction in the profile is achieved, and the spherical aberration, the astigmatism, the field curvature, and the distortion are properly corrected.

The object-side surface of the second lens L2 is the aspheric surface having at least one pole point in a position off the optical axis X. Therefore, the astigmatism, the field curvature, and the distortion are more properly corrected.

The third lens L3 has the negative refractive power and is formed in a meniscus shape having the object-side surface being concave and an image-side surface being convex in the paraxial region. Furthermore, both sides of the third lens L3 are formed as aspheric surfaces. Therefore, the chromatic aberration, the coma aberration, the astigmatism, the field curvature, and the distortion are properly corrected.

A shape of the third lens L3 may be a biconcave shape having the object-side surface being concave and the image-side surface being concave in the paraxial region as in Examples 2, 3, 4 and 5 shown in FIGS. 3, 5, 7 and 9. In this case, negative refractive power on both sides is favorable for correction of the chromatic aberration.

The fourth lens L4 has the positive refractive power and is formed in a meniscus shape having the object-side surface being concave and an image-side surface being convex in the paraxial region. Furthermore, both sides of the fourth lens L4 are formed as aspheric surfaces. Therefore, the coma aberration, the astigmatism, the field curvature, and the distortion are properly corrected.

The fifth lens L5 has the positive refractive power and is formed in a biconvex shape having an object-side surface being convex and an image-side surface being convex in the paraxial region. Furthermore, both sides of the fourth lens L4 are formed as aspheric surfaces. Therefore, the astigmatism, the field curvature, and the distortion are properly corrected.

A shape of the fifth lens L5 may be a meniscus shape having the object-side surface being convex and the image-side surface being concave in the paraxial region as in Examples 2, 3, 4 and 5 shown in FIGS. 3, 5, 7 and 9. In this case, such a shape is favorable for correction of the astigmatism, the field curvature, and the distortion.

The object-side surface of the fifth lens L5 is the aspheric surface having at least one pole point in a position off the optical axis X. Therefore, the astigmatism, the field curvature, and the distortion are more properly corrected.

The image-side surface of the fifth lens L5 is the aspheric surface having at least one pole point in a position off the optical axis X. Therefore, the astigmatism, the field curvature, and the distortion are more properly corrected.

The sixth lens L6 has the negative refractive power and is formed in a meniscus shape having the object-side surface being convex and an image-side surface being concave in the paraxial region. Furthermore, both sides of the sixth lens L6 are formed as aspheric surfaces. Therefore, the astigmatism, the field curvature, and the distortion are properly corrected.

Refractive power of the sixth lens L6 may be positive as in Examples 2, 3, 4 and 5 shown in FIGS. 3, 5, 7 and 9. In this case, such refractive power is favorable for correction of the astigmatism, the field curvature, and the distortion.

The seventh lens L7 has the negative refractive power and is formed in a meniscus shape having an object-side surface being convex and the image-side surface being concave in the paraxial region. Furthermore, both sides of the seventh lens L7 are formed as aspheric surfaces. Therefore, the chromatic aberration, the astigmatism, the field curvature, and the distortion are properly corrected. Additionally, the low profile is maintained and a back focus is secured by the concave image-side surface of the seventh lens L7.

The object-side surface of the seventh lens L7 is the aspheric surface having at least one pole point in a position off the optical axis X. Therefore, the astigmatism, the field curvature, and the distortion are more properly corrected.

The image-side surface of the seventh lens L7 is the aspheric surface having at least one pole point in a position off the optical axis X. Therefore, the astigmatism, the field curvature, and the distortion are more properly corrected.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are properly corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effects by satisfying the following conditional expressions (1) to (24), $$0.02 < (D6/|f6|) \times 100 < 2.55 \quad (1)$$

$$0.50 < f1/f < 1.70 \quad (2)$$

$$3.75 < f5/f < 17.50 \quad (3)$$

$$0.20 < (f1/|f6|) \times 100 < 35.00 \quad (4)$$

$$0.60 < r13/f < 3.50 \quad (5)$$

$$13.00 < vd4 < 26.00 \quad (6)$$

$$19.00 < vd6 < 37.00 \quad (7)$$

$$3.50 < (vd2/vd4) \times (vd5/vd6) < 7.50 \quad (8)$$

$$1.50 < r3/f < 6.00 \quad (9)$$

$$-1.55 < r4/f < -0.40 \quad (10)$$

$$-3.00 < r5/f < -0.50 \quad (11)$$

$$7.00 < |r6|/f \quad (12)$$

$$-5.00 < r7/f < -0.50 \quad (13)$$

$$-3.00 < r8/f < -0.40 \quad (14)$$

$$1.30 < |r9|/f < 10.50 \quad (15)$$

$$2.00 < |r10|/f < 12.00 \quad (16)$$

$$0.85 < r12/f < 2.00 \quad (17)$$

$$-25.00 < |r61|/r7 < -0.30 \quad (18)$$

$$0.20 < r12/r13 < 1.40 \quad (19)$$

$$-3.50 < r13/f7 < -0.65 \quad (20)$$

$$8.75 < f2/D2 < 20.00 \quad (21)$$

$$-17.00 < f5/f7 < -2.50 \quad (22)$$

$$-0.60 < f4/f5/f7 < -0.04 \quad (23)$$

$$3.60 < |f6|/f \quad (24)$$

where
vd2: an abbe number at d-ray of the second lens L2,
vd4: an abbe number at d-ray of the fourth lens L4,
vd5: an abbe number at d-ray of the fifth lens L5,
vd6: an abbe number at d-ray of the sixth lens L6,
D2: a thickness along the optical axis X of the second lens L2,
D6: a thickness along the optical axis X of the sixth lens L6,
f: a focal length of the overall optical system of the imaging lens,
f1: a focal length of the first lens L1,
f2: a focal length of the second lens L2,
f4: a focal length of the fourth lens L4,
f5: a focal length of the fifth lens L5,
f6: a focal length of the sixth lens L6,
f7: a focal length of the seventh lens. L7,
r3: a paraxial curvature radius of an object-side surface of the second lens L2,
r4: a paraxial curvature radius of an image-side surface of the second lens L2,
r5: a paraxial curvature radius of an object-side surface of the third lens L3,
r6: a paraxial curvature radius of an image-side surface of the third lens L3,
r7: a paraxial curvature radius of an object-side surface of the fourth lens L4,
r8: a paraxial curvature radius of an image-side surface of the fourth lens L4,
r9: a paraxial curvature radius of an object-side surface of the fifth lens L5,
r10: a paraxial curvature radius of an image-side surface of the fifth lens L5,
r12: a paraxial curvature radius of an image-side surface of the sixth lens L6, and
r13: a paraxial curvature radius of an object-side surface of the seventh lens L7.

It is not necessary to satisfy the above all conditional expressions. An operational advantage corresponding to each conditional expression can be obtained by satisfying the conditional expression individually.

The imaging lens according to the present embodiments shows further preferable effects by satisfying the following conditional expressions (1a) to (24a), $$0.03 < (D6/|f6|) \times 100 < 2.15 \quad (1a)$$

$$0.90 < f1/f < 1.55 \quad (2a)$$

$$4.50 < f5/f < 14.50 \quad (3a)$$

$$0.30 < (f1/|f6|) \times 100 < 28.00 \quad (4a)$$

$0.85 < r13/f < 2.80$ (5a)

$16.00 < vd4 < 23.00$ (6a)

$24.00 < vd6 < 33.00$ (7a)

$4.60 < (vd2/vd4) \times (vd5/vd6) < 6.50$ (8a)

$2.30 < r3/f < 5.00$ (9a)

$-1.25 < r4/f < -0.65$ (10a)

$-2.40 < r5/f < -1.00$ (11a)

$11.00 < |r6|/f < 100.00$ (12a)

$-4.00 < r7/f < -0.75$ (13a)

$-2.40 < r8/f < -0.70$ (14a)

$1.85 < |r9|/f < 8.50$ (15a)

$3.50 < |r10|/f < 9.50$ (16a)

$1.00 < r12/f < 1.60$ (17a)

$-20.00 < |r6|/r7 < -3.00$ (18a)

$0.40 < r12/r13 < 1.20$ (19a)

$-2.80 < r13/f7 < -0.85$ (20a)

$10.00 < f2/D2 < 16.50$ (21a)

$-14.00 < f5/f7 < -4.00$ (22a)

$-0.50 < f4/f5/f7 < -0.06$ (23a)

$4.75 < |f6|/f < 1000.00$. (24a)

The signs in the above conditional expressions have the same meanings as those in the paragraph before the preceding paragraph. Additionally, only lower limits or upper limits of the conditional expressions (1a) to (24a) may be applied to the corresponding conditional expressions (1) to (24).

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$ [Equation 1]

Next, examples of the imaging lens according to this embodiment will be explained. In each example, f denotes a focal length of the overall optical system of the imaging lens, Fno denotes a F-number, w denotes a half field of view, ih denotes a maximum image height, and TTL denotes a total track length. Additionally, i denotes a surface number counted from the object side, r denotes a paraxial curvature radius, d denotes a distance between lenses along the optical axis (surface distance), Nd denotes a refractive index at d-ray (reference wavelength), and vd denotes an abbe number at d-ray. As for aspheric surfaces, an asterisk (*) is added after surface number Example 1

The basic lens data is shown below in Table 1.

TABLE 1

Example 1

Unit mm f = 6.86
Fno = 1.94
ω(°) = 48.9
ih = 7.93
TTL = 8.25

Surface Data

| i | r | d | Nd | vd | |
|---|---|---|---|---|---|
| (Object) | Infinity | Infinity | | | |
| 1(Stop) | Infinity | −0.4488 | | | |
| 2* | 2.9433 | 0.7057 | 1.535 | 55.69 | (vd1) |
| 3* | 7.0325 | 0.5027 | | | |
| 4* | 27.2220 | 0.7397 | 1.535 | 55.69 | (vd2) |
| 5* | −5.9734 | 0.0500 | | | |
| 6* | −10.7551 | 0.3600 | 1.671 | 19.24 | (vd3) |
| 7* | −117.0592 | 0.7581 | | | |
| 8* | −7.2279 | 0.6516 | 1.671 | 19.24 | (vd4) |
| 9* | −6.4085 | 0.4531 | | | |
| 10* | 46.6888 | 0.6984 | 1.535 | 55.69 | (vd5) |
| 11* | −33.5622 | 0.2967 | | | |
| 12* | 14.4177 | 0.7448 | 1.588 | 28.36 | (vd6) |
| 13* | 8.8989 | 0.2902 | | | |

TABLE 1-continued

Example 1

| | | | | | | |
|---|---|---|---|---|---|---|
| 14* | 15.3198 | 0.7950 | | 1.567 | 37.40 | (vd7) |
| 15* | 3.0719 | 0.4732 | | | | |
| 16 | Infinity | 0.1500 | | 1.517 | 64.20 | |
| 17 | Infinity | 0.6312 | | | | |
| Image Plane | | | | | | |

Constituent Lens Data

| Lens | Start Surface | Focal Length | TTL to diagonal length of effective image area |
|---|---|---|---|
| 1 | 2 | 8.928 | 0.52 |
| 2 | 4 | 9.231 | |
| 3 | 6 | −17.681 | |
| 4 | 8 | 63.889 | |
| 5 | 10 | 36.621 | |
| 6 | 12 | −41.650 | |
| 7 | 14 | −6.938 | |

Aspheric Surface Data

| | 2nd Surface | 3rd Surface | 4th Surface | 5th Surface | 6th Surface | 7th Surface | 8th Surface |
|---|---|---|---|---|---|---|---|
| k | −1.199050E+00 | −1.428479E+00 | 0.000000E+00 | 0.000000E+00 | 0.000000E+00 | 0.000000E+00 | 0.000000E+00 |
| A4 | 1.707008E−04 | −4.708596E−03 | −7.740247E−03 | −2.029489E−02 | −1.432747E−02 | 1.691648E−03 | −1.183651E−03 |
| A6 | 6.217007E−03 | 3.295552E−03 | −3.497123E−03 | 1.043519E−02 | 1.377444E−02 | −7.993640E−03 | −7.908446E−03 |
| A8 | −1.239083E−02 | −1.403652E−02 | 5.302740E−03 | −2.266921E−02 | −3.335675E−02 | 1.162596E−02 | 1.185228E−02 |
| A10 | 1.268628E−02 | 1.984553E−02 | −5.861894E−03 | 2.578840E−02 | 3.840333E−02 | −1.632349E−02 | −1.365429E−02 |
| A12 | −8.532900E−03 | −1.667355E−02 | 3.734918E−03 | −1.679502E−02 | −2.553448E−02 | 1.422063E−02 | 9.318277E−03 |
| A14 | 3.683173E−03 | 8.519971E−03 | −1.367725E−03 | 6.626039E−03 | 1.053957E−02 | −7.460568E−03 | −4.021177E−03 |
| A16 | −1.002861E−03 | −2.612645E−03 | 2.723448E−04 | −1.576054E−03 | −2.664629E−03 | 2.335690E−03 | 1.054711E−03 |
| A18 | 1.572850E−04 | 4.460333E−04 | −2.136621E−05 | 2.092280E−04 | 3.828001E−04 | −4.021808E−04 | −1.538271E−04 |
| A20 | −1.079224E−05 | −3.270033E−05 | −6.014698E−07 | −1.205124E−05 | −2.408381E−05 | 2.957023E−05 | 9.566519E−06 |

| | 9th Surface | 10th Surface | 11th Surface | 12th Surface | 13th Surface | 14th Surface | 15th Surface |
|---|---|---|---|---|---|---|---|
| k | 0.000000E+00 | 0.000000E+00 | 0.000000E+00 | 0.000000E+00 | 0.000000E+00 | 0.000000E+00 | −9.297706E+00 |
| A4 | 6.762549E−03 | 3.785304E−02 | 6.223526E−02 | 2.298245E−02 | 1.355095E−02 | −2.354170E−02 | −1.494949E−02 |
| A6 | −1.138976E−02 | −2.463785E−02 | −2.421619E−02 | −1.322268E−02 | −7.489018E−03 | 5.633787E−03 | 2.106923E−03 |
| A8 | 8.134995E−03 | 9.505884E−03 | 5.382534E−03 | 2.625371E−03 | 1.349898E−03 | −6.912547E−04 | −1.634211E−04 |
| A10 | −4.436942E−03 | −3.271713E−03 | −8.192193E−04 | −3.271713E−04 | −1.373120E−04 | 5.141182E−05 | 7.457432E−06 |
| A12 | 1.638393E−03 | 8.329772E−04 | 8.592193E−05 | 2.064023E−05 | 8.728717E−06 | −2.450467E−06 | −1.936313E−07 |
| A14 | −4.013870E−04 | −1.407560E−04 | −6.100241E−06 | −9.287629E−07 | −3.548209E−07 | 7.471630E−08 | 2.279829E−09 |
| A16 | 6.096954E−05 | 1.440551E−05 | 2.800015E−07 | 2.613086E−08 | 8.962083E−09 | −1.400573E−09 | 7.092878E−12 |
| A18 | −5.075593E−06 | −7.932841E−07 | −7.491335E−09 | −4.192484E−10 | −1.277644E−10 | 1.464575E−11 | −4.529958E−13 |
| A20 | 1.746726E−07 | 1.790510E−08 | 8.871130E−11 | 2.927727E−12 | 7.828178E−13 | −6.526407E−14 | 3.223119E−15 |

The imaging lens in Example 1 achieves a ratio of a total track length to a diagonal length of an effective image area of the image sensor of 0.52, and a F number of 1.94. As shown in Table 6, the imaging lens in Example 1 satisfies the conditional expressions (1) to (24).

Figure 2:
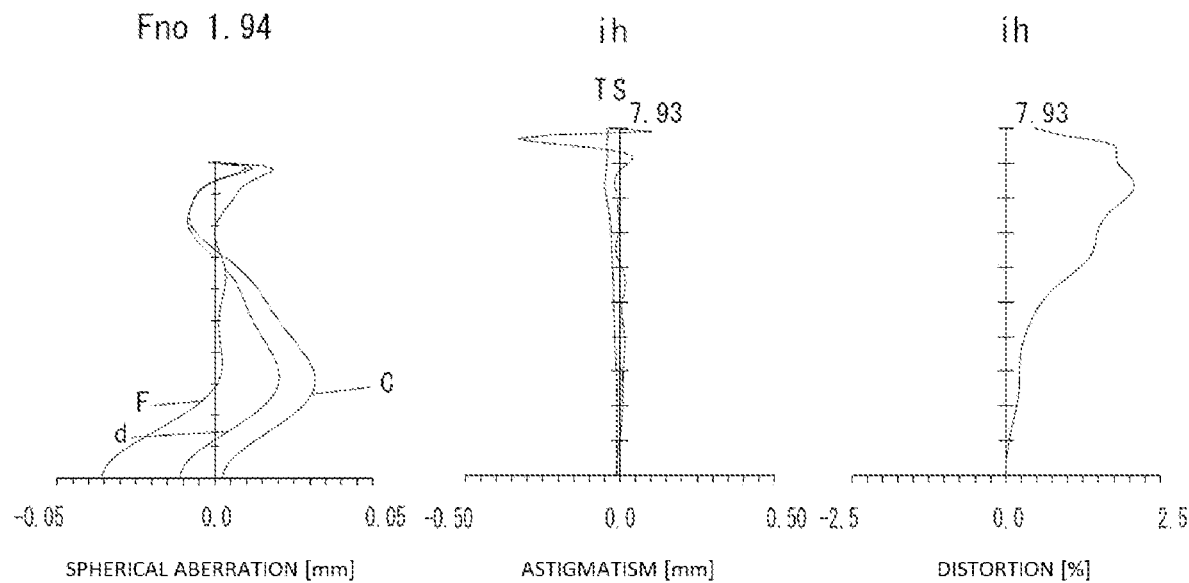
FIG. 2 shows spherical aberration, astigmatism, and distortion of the imaging lens in Example 1 according to the present invention.
Figure 3:
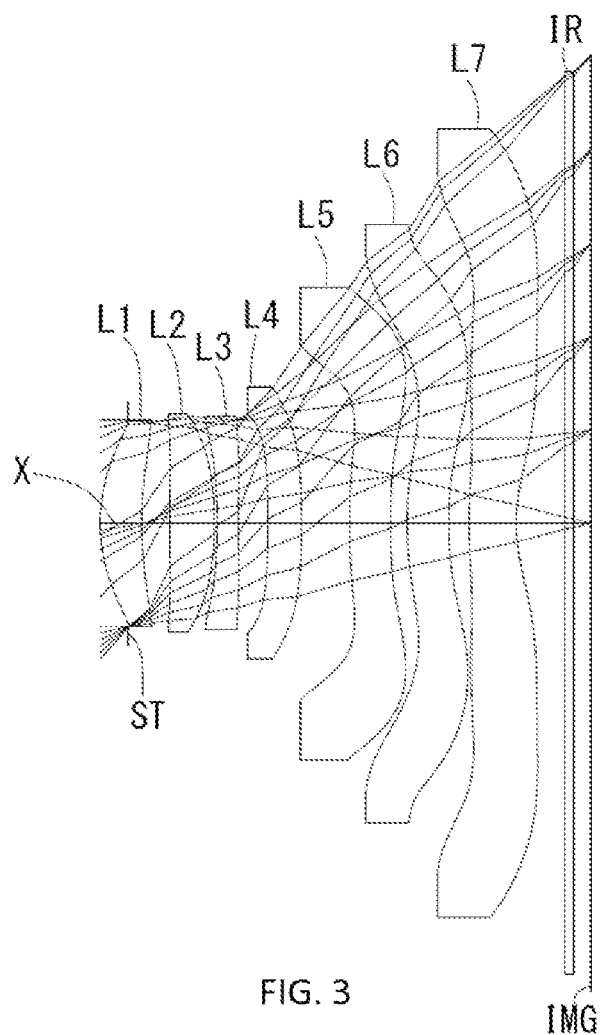
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8 and 10). As shown in FIG. 2, each aberration is corrected excellently.

Example 2

The basic lens data is shown below in Table 2.

TABLE 2

Example 2

Unit mm $f = 6.82$ $Fno = 1.94$ $\omega(°) = 49.0$ $h = 7.93$ $TTL = 8.25$

TABLE 2-continued

Example 2

Surface Data

| i | r | d | Nd | vd | |
|---|---|---|---|---|---|
| (Object) | Infinity | Infinity | | | |
| 1(Stop) | Infinity | −0.4840 | | | |
| 2* | 2.8854 | 0.7007 | 1.535 | 55.69 | (vd1) |
| 3* | 6.1968 | 0.4742 | | | |
| 4* | 21.7548 | 0.7551 | 1.535 | 55.69 | (vd2) |
| 5* | −6.9186 | 0.0500 | | | |
| 6* | −11.1731 | 0.3600 | 1.671 | 19.24 | (vd3) |
| 7* | 136.4188 | 0.4954 | | | |
| 8* | −21.9113 | 0.5737 | 1.671 | 19.24 | (vd4) |
| 9* | −12.4281 | 0.8164 | | | |
| 10* | 23.1701 | 0.6908 | 1.535 | 55.69 | (vd5) |
| 11* | 51.0009 | 0.2772 | | | |
| 12* | 7.7906 | 0.7000 | 1.588 | 28.36 | (vd6) |
| 13* | 7.8620 | 0.3437 | | | |
| 14* | 8.1687 | 0.7950 | 1.567 | 37.40 | (vd7) |
| 15* | 2.5975 | 0.8228 | | | |
| 16 | Infinity | 0.1500 | 1.517 | 64.20 | |
| 17 Image Plane | Infinity | 0.2960 | | | |

Constituent Lens Data

| Lens | Start Surface | Focal Length | TTL to diagonal length of effective image area |
|---|---|---|---|
| 1 | 2 | 9.403 | 0.52 |
| 2 | 4 | 9.906 | |
| 3 | 6 | −15.382 | |
| 4 | 8 | 41.797 | |
| 5 | 10 | 78.712 | |
| 6 | 12 | 315.432 | |
| 7 | 14 | −7.081 | |

Aspheric Surface Data

| | 2nd Surface | 3rd Surface | 4th Surface | 5th Surface | 6th Surface | 7th Surface | 8th Surface |
|---|---|---|---|---|---|---|---|
| k | −1.118314E+00 | −9.752002E−01 | 0.000000E+00 | 0.000000E+00 | 0.000000E+00 | 0.000000E+00 | 0.000000E+00 |
| A4 | 9.356591E−04 | −2.845089E−03 | −7.228391E−03 | −2.359049E−02 | −1.423636E−02 | 5.034332E−03 | −5.160811E−03 |
| A6 | 3.324337E−03 | −8.983574E−03 | −1.385607E−02 | −2.484398E−04 | 5.143378E−03 | −1.761604E−02 | −5.031542E−03 |
| A8 | −2.672262E−03 | 1.613378E−02 | 2.653038E−02 | 8.774285E−03 | −7.561841E−03 | 2.595932E−02 | −3.959487E−03 |
| A10 | −2.947201E−03 | −2.096044E−02 | −3.277098E−02 | −1.084961E−02 | 9.829884E−03 | −2.702194E−02 | 1.009102E−02 |
| A12 | 5.803605E−03 | 1.634607E−02 | 2.535734E−02 | 7.803330E−03 | −7.821360E−03 | 1.826918E−02 | −9.592130E−03 |
| A14 | −4.071070E−03 | −7.848606E−03 | −1.222518E−02 | −3.603753E−03 | 3.680769E−03 | −8.042295E−03 | 4.958600E−03 |
| A16 | 1.452578E−03 | 2.271579E−03 | 3.596159E−03 | 1.035634E−03 | −1.014437E−03 | 2.225569E−03 | −1.492261E−03 |
| A18 | −2.639352E−04 | −3.606716E−04 | −5.901112E−04 | −1.678908E−04 | 1.557129E−04 | −3.499142E−04 | 2.448412E−04 |
| A20 | 1.944959E−05 | 2.409713E−05 | 4.126645E−05 | 1.170926E−05 | −1.029460E−05 | 2.399361E−05 | −1.690466E−05 |

| | 9th Surface | 10th Surface | 11th Surface | 12th Surface | 13th Surface | 14th Surface | 15th Surface |
|---|---|---|---|---|---|---|---|
| k | 0.000000E+00 | 0.000000E+00 | 0.000000E+00 | 0.000000E+00 | 0.000000E+00 | 0.000000E+00 | −7.781156E+00 |
| A4 | 2.029738E−03 | 2.460999E−02 | 4.079081E−02 | 1.961792E−02 | 2.583753E−02 | −2.844030E−02 | −1.570759E−02 |
| A6 | −1.430169E−02 | −1.357977E−02 | −1.417450E−02 | −1.295266E−02 | −1.256787E−02 | 5.980786E−03 | 1.861939E−03 |
| A8 | 1.201049E−02 | 3.707205E−03 | 2.647680E−03 | 2.794260E−03 | 2.543911E−03 | −7.175813E−04 | −1.198311E−04 |
| A10 | −7.671168E−03 | −1.087188E−03 | −3.541617E−04 | −3.621605E−04 | −3.178701E−04 | 5.449568E−05 | 4.800288E−06 |
| A12 | 3.401422E−03 | 2.562785E−04 | 3.627158E−05 | 3.043830E−05 | 2.578193E−05 | −2.699968E−06 | −1.237153E−07 |
| A14 | −9.955019E−04 | −4.039355E−05 | −2.881141E−06 | −1.665913E−06 | −1.348869E−06 | 8.559998E−08 | 1.913468E−09 |
| A16 | 1.798931E−04 | 3.777853E−06 | 1.626569E−07 | 5.749559E−08 | 4.359434E−08 | −1.655139E−09 | −1.352903E−11 |
| A18 | −1.786443E−05 | −1.829099E−07 | −5.522652E−09 | −1.139270E−09 | −7.867285E−10 | 1.765595E−11 | −2.289721E−14 |
| A20 | 7.371716E−07 | 3.433923E−09 | 8.219256E−11 | 9.886930E−12 | 6.038105E−12 | −7.925614E−14 | 6.509650E−16 |

The imaging lens in Example 2 achieves a ratio of a total track length to a diagonal length of an effective image area of the image sensor of 0.52, and a F number of 1.94. As shown in Table 6, the imaging lens in Example 2 satisfies the conditional expressions (1) to (24).

Figure 4:
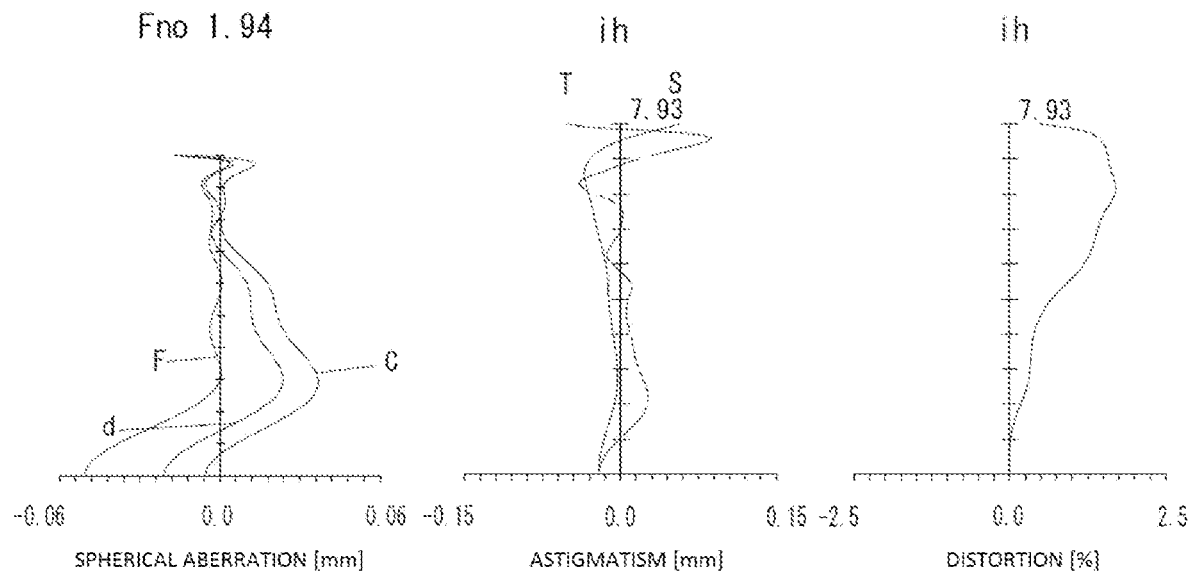
FIG. 4 shows spherical aberration, astigmatism, and distortion of the imaging lens in Example 2 according to the present invention.
Figure 5:
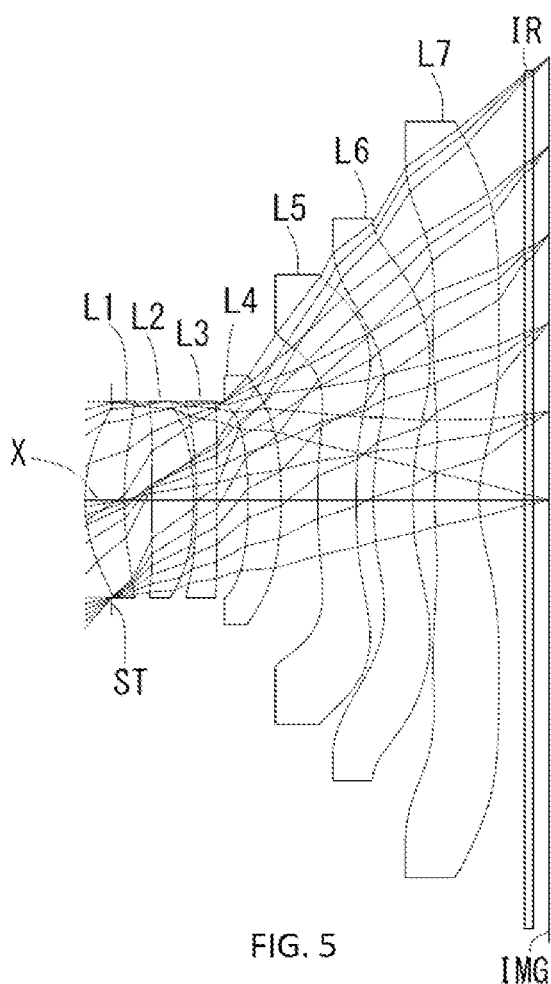
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3

Unit mm f = 6.82
Fno = 1.94
ω(°) = 49.1
h = 7.93
TTL = 8.24

Surface Data

| i | r | d | Nd | vd | |
|---|---|---|---|---|---|
| (Object) | Infinity | Infinity | | | |
| 1(Stop) | Infinity | −0.4784 | | | |
| 2* | 2.8413 | 0.7023 | 1.535 | 55.69 | (vd1) |
| 3* | 5.9988 | 0.4904 | | | |
| 4* | 22.4527 | 0.7494 | 1.535 | 55.69 | (vd2) |
| 5* | −6.2266 | 0.0502 | | | |
| 6* | −12.4304 | 0.3602 | 1.671 | 19.24 | (vd3) |
| 7* | 108.8001 | 0.5637 | | | |
| 8* | −8.0973 | 0.5901 | 1.671 | 19.24 | (vd4) |
| 9* | −7.7070 | 0.6560 | | | |
| 10* | 16.1912 | 0.6906 | 1.535 | 55.69 | (vd5) |
| 11* | 37.0910 | 0.3079 | | | |
| 12* | 7.8149 | 0.7046 | 1.588 | 28.36 | (vd6) |
| 13* | 7.6001 | 0.3872 | | | |
| 14* | 7.7741 | 0.7952 | 1.567 | 37.40 | (vd7) |
| 15* | 2.5832 | 0.8090 | | | |
| 16 | Infinity | 0.1500 | 1.517 | 64.20 | |
| 17 | Infinity | 0.2889 | | | |
| Image Plane | | | | | |

Constituent Lens Data

| Lens | Start Surface | Focal Length | TTL to diagonal length of effective image area |
|---|---|---|---|
| 1 | 2 | 9.367 | 0.52 |
| 2 | 4 | 9.199 | |
| 3 | 6 | −16.612 | |
| 4 | 8 | 148.338 | |
| 5 | 10 | 53.117 | |
| 6 | 12 | 2198.370 | |
| 7 | 14 | −7.221 | |

Aspheric Surface Data

| | 2nd Surface | 3rd Surface | 4th Surface | 5th Surface | 6th Surface | 7th Surface | 8th Surface |
|---|---|---|---|---|---|---|---|
| k | −1.046023E+00 | 3.720308E−01 | 0.000000E+00 | 0.000000E+00 | 0.000000E+00 | 0.000000E+00 | 0.000000E+00 |
| A4 | 2.573262E−03 | −3.830425E−03 | −1.224317E−02 | −2.865685E−02 | −1.459058E−02 | 5.376040E−03 | −9.933968E−03 |
| A6 | 2.266681E−03 | −2.014678E−03 | 1.057446E−03 | 2.650541E−02 | 2.414599E−02 | −8.828127E−03 | −6.326461E−04 |
| A8 | −5.244558E−03 | −2.550240E−05 | −4.542205E−03 | −4.153270E−02 | −4.239072E−02 | 1.274631E−02 | −5.753366E−03 |
| A10 | 5.493053E−03 | 8.746401E−04 | 5.337644E−03 | 4.137365E−02 | 4.264047E−02 | −1.741377E−02 | 9.845765E−03 |
| A12 | −3.833898E−03 | −1.718582E−03 | −4.110822E−03 | −2.622369E−02 | −2.719824E−02 | 1.442221E−02 | −9.362371E−03 |
| A14 | 1.701666E−03 | 1.385651E−03 | 2.091345E−03 | 1.064615E−02 | 1.123574E−02 | −7.361104E−03 | 5.087554E−03 |
| A16 | −4.783858E−04 | −5.846890E−04 | −6.447294E−04 | −2.684794E−03 | −2.921226E−03 | 2.275521E−03 | −1.621976E−03 |
| A18 | 7.709703E−05 | 1.291317E−04 | 1.111657E−04 | 3.826202E−04 | 4.369901E−04 | −3.914106E−04 | 2.801044E−04 |
| A20 | −5.353122E−06 | −1.151796E−05 | −8.263287E−06 | −2.348177E−05 | −2.853305E−05 | 2.900917E−05 | −2.021378E−05 |

| | 9th Surface | 10th Surface | 11th Surface | 12th Surface | 13th Surface | 14th Surface | 15th Surface |
|---|---|---|---|---|---|---|---|
| k | 0.000000E+00 | 0.000000E+00 | 0.000000E+00 | 0.000000E+00 | 0.000000E+00 | −2.789910E−03 | −7.300211E+00 |
| A4 | −4.706282E−03 | 1.739564E−02 | 3.595959E−02 | 2.001957E−02 | 2.234121E−02 | −3.505276E−02 | −1.755490E−02 |
| A6 | −1.004688E−02 | −9.239851E−03 | −1.232414E−02 | −1.291958E−02 | −1.129767E−02 | 7.404991E−03 | 2.332097E−03 |
| A8 | 1.066154E−02 | 1.697049E−03 | 2.303377E−03 | 2.755352E−03 | 2.253351E−03 | −8.858489E−04 | −1.826118E−04 |
| A10 | −8.007007E−03 | −2.868862E−04 | −3.224072E−04 | −3.580722E−04 | −2.770074E−04 | 6.715082E−05 | 9.636623E−06 |
| A12 | 3.852112E−03 | 2.416902E−05 | 3.533388E−05 | 3.011929E−05 | 2.213618E−05 | −3.335271E−06 | −3.529296E−07 |

TABLE 3-continued

| | | | Example 3 | | | | |
|---|---|---|---|---|---|---|---|
| A14 | −1.159668E−03 | 3.552703E−06 | −2.937145E−06 | −1.622428E−06 | −1.142122E−06 | 1.070469E−07 | 8.757096E−09 |
| A16 | 2.088425E−04 | −1.222406E−06 | 1.660400E−07 | 5.382080E−08 | 3.643338E−08 | −2.123173E−09 | −1.394806E−10 |
| A18 | −2.026051E−05 | 1.235489E−07 | −5.452488E−09 | −1.000269E−09 | −6.496483E−10 | 2.358329E−11 | 1.284237E−12 |
| A20 | 8.049299E−07 | −4.302326E−09 | 7.704998E−11 | 7.968124E−12 | 4.932844E−12 | −1.120769E−13 | −5.199520E−15 |

The imaging lens in Example 3 achieves a ratio of a total track length to a diagonal length of an effective image area of the image sensor of 0.52, and a F number of 1.94. As shown in Table 6, the imaging lens in Example 3 satisfies the conditional expressions (1) to (24).

Figure 6:
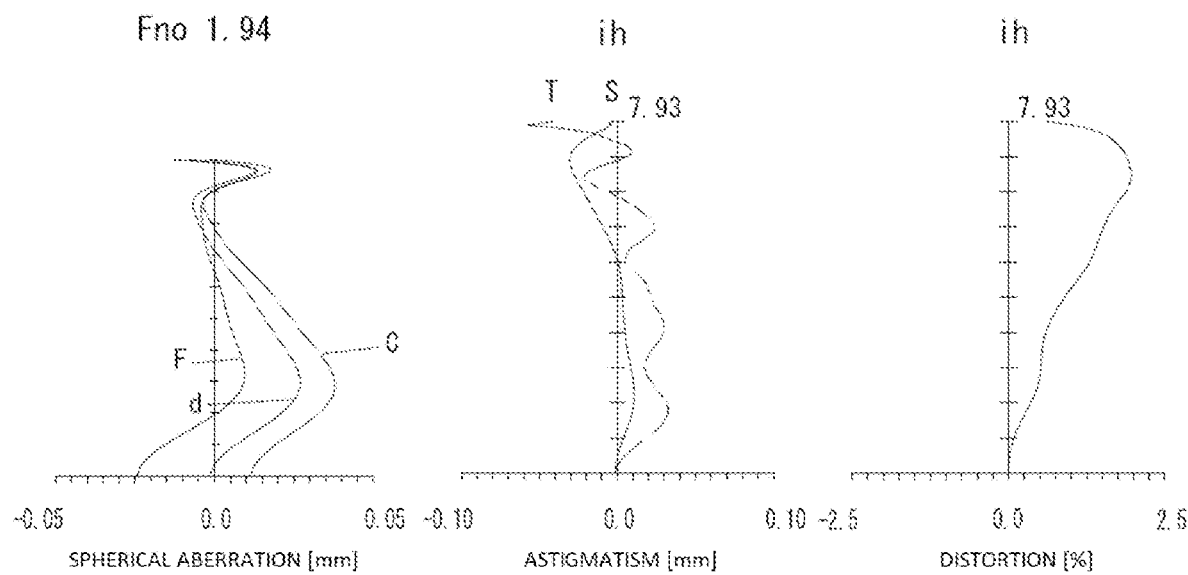
FIG. 6 shows spherical aberration, astigmatism, and distortion of the imaging lens in Example 3 according to the present invention.
Figure 7:
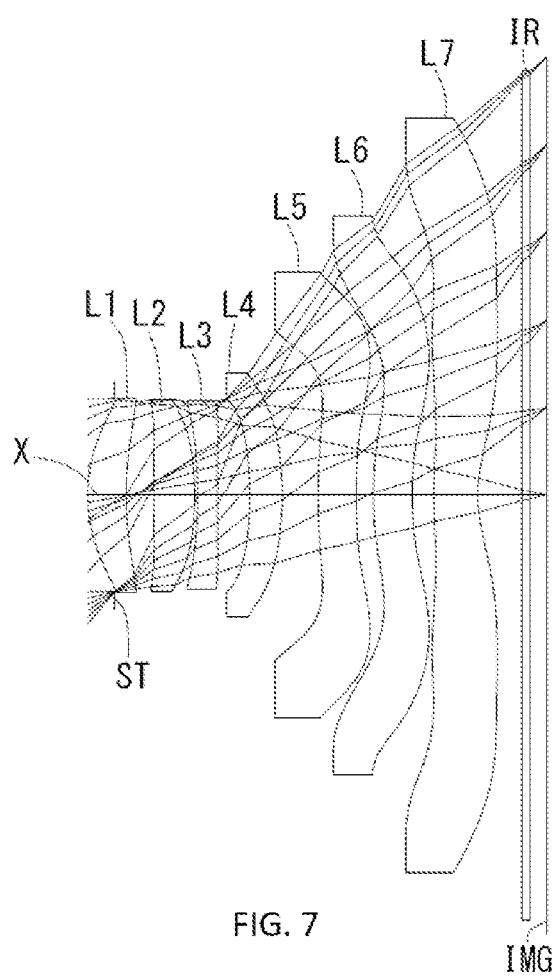
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm f = 6.81
Fno = 1.94
ω(°) = 49.2
h = 7.93
TTL = 8.24

Surface Data

| i | r | d | Nd | vd | |
|---|---|---|---|---|---|
| (Object) | Infinity | Infinity | | | |
| 1(Stop) | Infinity | −0.4980 | | | |
| 2* | 2.8411 | 0.6937 | 1.535 | 55.69 | (vd1) |
| 3* | 5.9931 | 0.4927 | | | |
| 4* | 21.1512 | 0.7478 | 1.535 | 55.69 | (vd2) |
| 5* | −6.1946 | 0.0501 | | | |
| 6* | −11.4588 | 0.3600 | 1.671 | 19.24 | (vd3) |
| 7* | 127.4796 | 0.5800 | | | |
| 8* | −7.6682 | 0.5851 | 1.671 | 19.24 | (vd4) |
| 9* | −6.8869 | 0.6540 | | | |
| 10* | 18.2205 | 0.6900 | 1.535 | 55.69 | (vd5) |
| 11* | 36.5828 | 0.3050 | | | |
| 12* | 7.7969 | 0.7001 | 1.588 | 28.36 | (vd6) |
| 13* | 7.5866 | 0.3898 | | | |
| 14* | 7.7692 | 0.7968 | 1.567 | 37.40 | (vd7) |
| 15* | 2.5794 | 0.8063 | | | |
| 16 | Infinity | 0.1500 | 1.517 | 64.20 | |
| 17 | Infinity | 0.2914 | | | |
| Image Plane | | | | | |

Constituent Lens Data

| Lens | Start Surface | Focal Length | TTL to diagonal length of effective image area |
|---|---|---|---|
| 1 | 2 | 9.381 | 0.52 |
| 2 | 4 | 9.045 | |
| 3 | 6 | −15.658 | |
| 4 | 8 | 77.484 | |
| 5 | 10 | 66.998 | |
| 6 | 12 | 2061.186 | |
| 7 | 14 | −7.209 | |

Aspheric Surface Data

| | 2nd Surface | 3rd Surface | 4th Surface | 5th Surface | 6th Surface | 7th Surface | 8th Surface |
|---|---|---|---|---|---|---|---|
| k | −1.026673E+00 | 6.919271E−01 | 0.000000E+00 | 0.000000E+00 | 0.000000E+00 | 0.000000E+00 | 0.000000E+00 |
| A4 | 2.651374E−03 | −3.051361E−03 | −1.213014E−02 | −2.873472E−02 | −1.368988E−02 | 5.792309E−03 | −7.169511E−03 |
| A6 | 2.191510E−03 | −4.879554E−03 | 1.127112E−03 | 2.650340E−02 | 1.931236E−02 | −1.017415E−02 | −6.956927E−03 |
| A8 | −5.076291E−03 | 5.565526E−03 | −4.563937E−03 | −3.997809E−02 | −3.141541E−02 | 1.549429E−02 | 2.853229E−03 |
| A10 | 5.248906E−03 | −5.332398E−03 | 5.298335E−03 | 3.796075E−02 | 2.871413E−02 | −2.033953E−02 | 3.339093E−03 |
| A12 | −3.618800E−03 | 2.508314E−03 | −4.052767E−03 | −2.301662E−02 | −1.666231E−02 | 1.634648E−02 | −6.370540E−03 |
| A14 | 1.588470E−03 | −4.075400E−04 | 2.042049E−03 | 8.973801E−03 | 6.339917E−03 | −8.149130E−03 | 4.240950E−03 |
| A16 | −4.421654E−04 | −1.209236E−04 | −6.242729E−04 | −2.183165E−03 | −1.551186E−03 | 2.469600E−03 | −1.475463E−03 |

TABLE 4-continued

Example 4

| | | | | | | | |
|---|---|---|---|---|---|---|---|
| A18 | 7.068481E−05 | 6.215056E−05 | 1.067659E−04 | 3.013191E−04 | 2.249986E−04 | −4.174902E−04 | 2.655234E−04 |
| A20 | −4.875664E−06 | −7.372453E−06 | −7.867808E−06 | −1.794517E−05 | −1.457320E−05 | 3.043868E−05 | −1.957805E−05 |

| | 9th Surface | 10th Surface | 11th Surface | 12th Surface | 13th Surface | 14th Surface | 15th Surface |
|---|---|---|---|---|---|---|---|
| k | 0.000000E+00 | 0.000000E+00 | 0.000000E+00 | 0.000000E+00 | 0.000000E+00 | 2.676217E−03 | −7.436516E+00 |
| A4 | −4.309938E−03 | 1.709826E−02 | 3.698300E−02 | 2.010212E−02 | 2.211779E−02 | −3.454744E−02 | −1.668339E−02 |
| A6 | −9.875602E−03 | −8.545896E−03 | −1.334632E−02 | −1.293667E−02 | −1.111442E−02 | 7.183562E−03 | 2.086142E−03 |
| A8 | 1.044820E−02 | 9.721991E−04 | 2.698313E−03 | 2.764617E−03 | 2.201826E−03 | −8.448403E−04 | −1.524582E−04 |
| A10 | −7.800885E−03 | 9.529535E−05 | −4.047312E−04 | −3.598973E−04 | −2.686856E−04 | 6.306204E−05 | 7.594850E−06 |
| A12 | 3.730533E−03 | −8.929378E−05 | 4.568565E−05 | 3.029798E−05 | 2.129997E−05 | −3.092178E−06 | −2.693570E−07 |
| A14 | −1.116295E−03 | 2.344373E−05 | −3.740151E−06 | −1.632601E−06 | −1.089768E−06 | 9.817276E−08 | 6.637358E−09 |
| A16 | 1.998174E−04 | −3.251926E−06 | 2.033731E−07 | 5.416813E−08 | 3.446560E−08 | −1.928263E−09 | −1.068819E−10 |
| A18 | −1.926786E−05 | 2.343121E−07 | −6.398729E−09 | −1.006918E−09 | −6.092579E−10 | 2.122015E−11 | 1.005523E−12 |
| A20 | 7.605105E−07 | −6.787210E−09 | 8.699302E−11 | 8.023128E−12 | 4.586137E−12 | −9.992190E−14 | −4.181317E−15 |

The imaging lens in Example 4 achieves a ratio of a total track length to a diagonal length of an effective image area of the image sensor of 0.52, and a F number of 1.94. As shown in Table 6, the imaging lens in Example 4 satisfies the conditional expressions (1) to (24).

Figure 8:
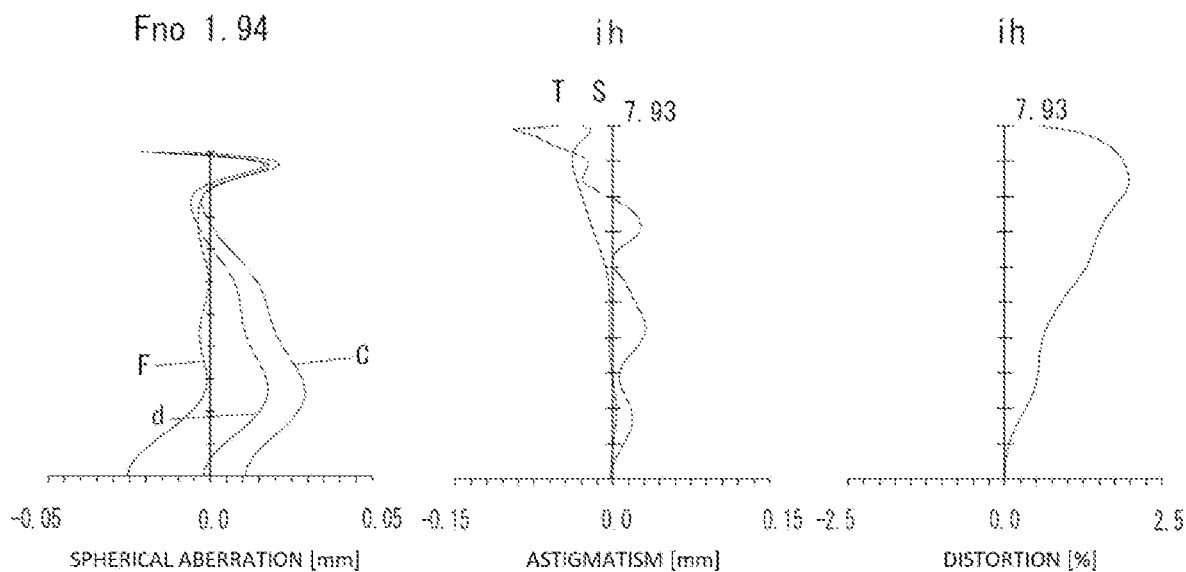
FIG. 8 shows spherical aberration, astigmatism, and distortion of the imaging lens in Example 4 according to the present invention.
Figure 9:
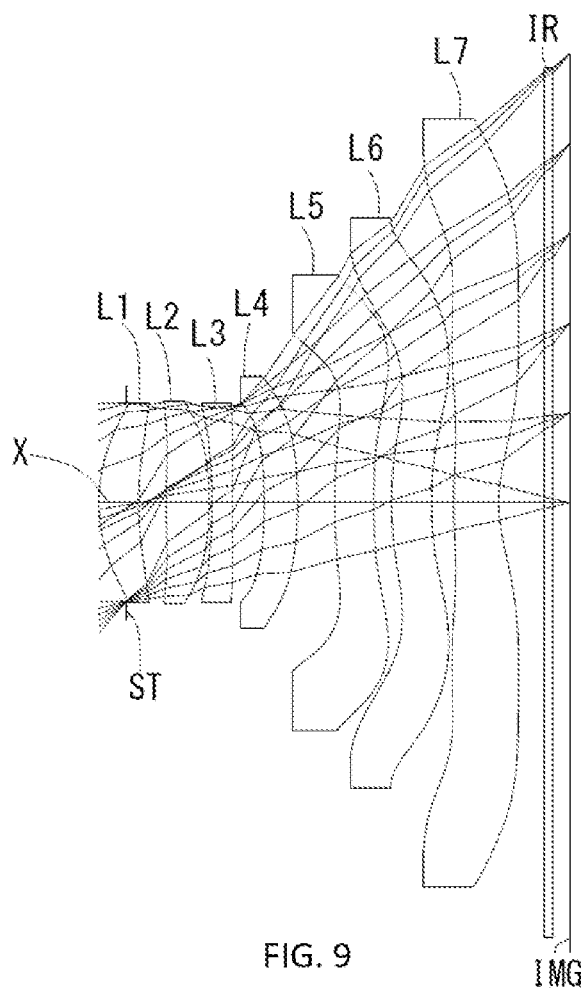
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unit mm f = 6.82
Fno = 1.94
ω(°) = 49.1
h = 7.93
TTL = 8.25

Surface Data

| i | r | d | Nd | vd | |
|---|---|---|---|---|---|
| (Object) | Infinity | Infinity | | | |
| 1(Stop) | Infinity | −0.4787 | | | |
| 2* | 2.8440 | 0.7030 | 1.535 | 55.69 | (vd1) |
| 3* | 6.0091 | 0.4909 | | | |
| 4* | 22.4781 | 0.7503 | 1.535 | 55.69 | (vd2) |
| 5* | −6.2392 | 0.0502 | | | |
| 6* | −12.4781 | 0.3603 | 1.671 | 19.24 | (vd3) |
| 7* | 106.7042 | 0.5644 | | | |
| 8* | −8.1210 | 0.5889 | 1.671 | 19.24 | (vd4) |
| 9* | −7.7199 | 0.6566 | | | |
| 10* | 16.1852 | 0.6906 | 1.535 | 55.69 | (vd5) |
| 11* | 36.8327 | 0.3074 | | | |
| 12* | 7.8090 | 0.7042 | 1.588 | 28.36 | (vd6) |
| 13* | 7.5941 | 0.3880 | | | |
| 14* | 7.7773 | 0.7955 | 1.567 | 37.40 | (vd7) |
| 15* | 2.5846 | 0.8099 | | | |
| 16 | Infinity | 0.1500 | 1.517 | 64.20 | |
| 17 | Infinity | 0.2906 | | | |
| Image Plane | | | | | |

Constituent Lens Data

| Lens | Start Surface | Focal Length | TTL to diagonal length of effective image area |
|---|---|---|---|
| 1 | 2 | 9.371 | 0.52 |
| 2 | 4 | 9.215 | |
| 3 | 6 | −16.635 | |
| 4 | 8 | 146.588 | |
| 5 | 10 | 53.364 | |
| 6 | 12 | 2205.837 | |
| 7 | 14 | −7.226 | |

TABLE 5-continued

Example 5

Aspheric Surface Data

|  | 2nd Surface | 3rd Surface | 4th Surface | 5th Surface | 6th Surface | 7th Surface | 8th Surface |
|---|---|---|---|---|---|---|---|
| k | −1.046148E+00 | 3.745927E−01 | 0.000000E+00 | 0.000000E+00 | 0.000000E+00 | 0.000000E+00 | 0.000000E+00 |
| A4 | 2.558942E−03 | −3.816590E−03 | −1.240843E−02 | −2.859595E−02 | −1.472617E−02 | 5.469154E−03 | −9.868344E−03 |
| A6 | 2.295551E−03 | −2.008033E−03 | 2.076166E−03 | 2.692994E−02 | 2.504776E−02 | −9.567475E−03 | −1.202791E−03 |
| A8 | −5.344952E−03 | −1.066946E−05 | −6.786810E−03 | −4.276003E−02 | −4.443533E−02 | 1.468258E−02 | −3.984320E−03 |
| A10 | 5.675011E−03 | 8.392573E−04 | 8.029211E−03 | 4.288949E−02 | 4.515499E−02 | −1.995702E−02 | 7.222012E−03 |
| A12 | −4.005219E−03 | −1.672850E−03 | −6.031938E−03 | −2.727152E−02 | −2.905901E−02 | 1.637776E−02 | −7.102600E−03 |
| A14 | 1.793871E−03 | 1.352575E−03 | 2.931816E−03 | 1.108123E−02 | 1.208789E−02 | −8.279798E−03 | 3.908877E−03 |
| A16 | −5.068139E−04 | −5.710211E−04 | −8.657996E−04 | −2.792415E−03 | −3.157209E−03 | 2.535545E−03 | −1.255331E−03 |
| A18 | 8.178159E−05 | 1.260792E−04 | 1.431890E−04 | 3.971931E−04 | 4.730630E−04 | −4.321876E−04 | 2.176302E−04 |
| A20 | −5.673736E−06 | −1.123664E−05 | −1.022171E−05 | −2.431012E−05 | −3.086337E−05 | 3.172806E−05 | −1.573164E−05 |

|  | 9th Surface | 10th Surface | 11th Surface | 12th Surface | 13th Surface | 14th Surface | 15th Surface |
|---|---|---|---|---|---|---|---|
| k | 0.000000E+00 | 0.000000E+00 | 0.000000E+00 | 0.000000E+00 | 0.000000E+00 | −5.806662E−04 | −7.295560E+00 |
| A4 | −4.698027E−03 | 1.747631E−02 | 3.585004E−02 | 2.001148E−02 | 2.223660E−02 | −3.493036E−02 | −1.735171E−02 |
| A6 | −9.943429E−03 | −9.364376E−03 | −1.228577E−02 | −1.289811E−02 | −1.121763E−02 | 7.362228E−03 | 2.268788E−03 |
| A8 | 1.044824E−02 | 1.771530E−03 | 2.301025E−03 | 2.750561E−03 | 2.231213E−03 | −8.786474E−04 | −1.739548E−04 |
| A10 | −7.765790E−03 | −2.986868E−04 | −3.230768E−04 | −3.574782E−04 | −2.735733E−04 | 6.644771E−05 | 8.975433E−06 |
| A12 | 3.700942E−03 | 2.113407E−05 | 3.545583E−05 | 3.545583E−05 | 2.180898E−05 | −3.292601E−06 | −3.223065E−07 |
| A14 | −1.105188E−03 | 5.027665E−06 | −2.941743E−06 | −1.620040E−06 | −1.122666E−06 | 1.054274E−07 | 7.878537E−09 |
| A16 | 1.975902E−04 | −1.454756E−06 | 1.656378E−07 | 5.375518E−08 | 3.573302E−08 | −2.086004E−09 | −1.242247E−10 |
| A18 | −1.902421E−05 | 1.402561E−07 | −5.414809E−09 | −9.994933E−10 | −6.357493E−10 | 2.311290E−11 | 1.137335E−12 |
| A20 | 7.488352E−07 | −4.766080E−09 | 7.619134E−11 | 7.967324E−12 | 4.816536E−12 | −1.095593E−13 | −4.597331E−15 |

The imaging lens in Example 5 achieves a ratio of a total track length to a diagonal length of an effective image area of the image sensor of 0.52, and a F number of 1.94. As shown in Table 6, the imaging lens in Example 5 satisfies the conditional expressions (1) to (24).

Figure 10:
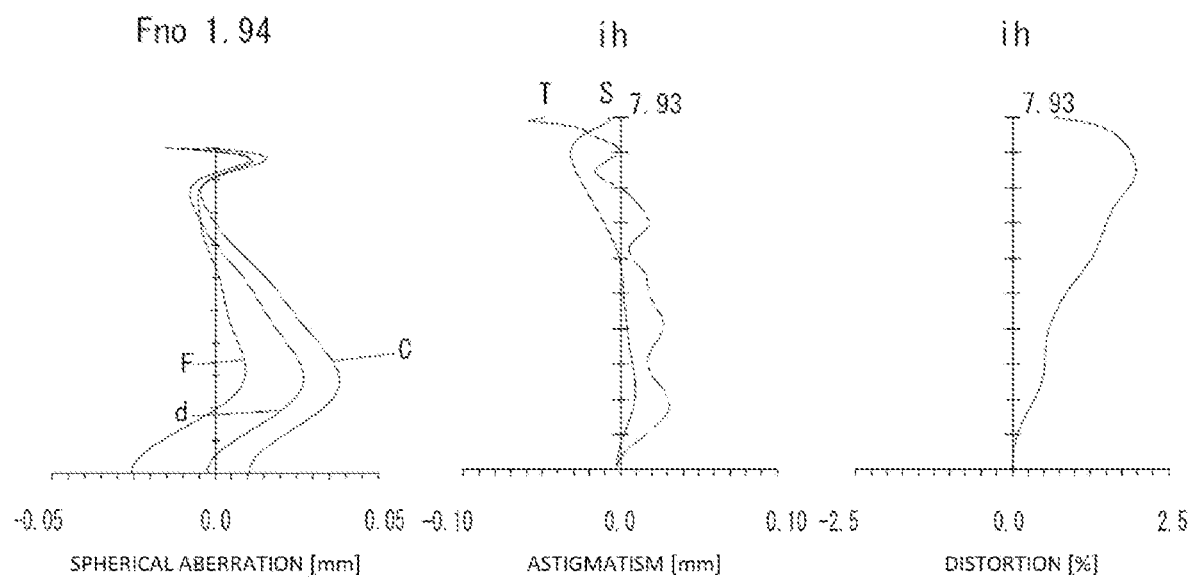
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

In table 6, values of conditional expressions (1) to (24) related to Examples 1 to 5 are shown.

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens
L3: third lens
L4: fourth lens

TABLE 6

|  | CondtionalExpression | Example 1 | Example 2 | Example 3 | Example 4 | Example 5 |
|---|---|---|---|---|---|---|
| (1) | (D6/|f6|) × 100 | 1.788 | 0.222 | 0.032 | 0.034 | 0.032 |
| (2) | f1/f | 1.30 | 1.38 | 1.37 | 1.38 | 1.37 |
| (3) | f5/f | 5.34 | 11.55 | 7.79 | 9.83 | 7.82 |
| (4) | (f1/|f6|) × 100 | 21.435 | 2.981 | 0.426 | 0.455 | 0.425 |
| (5) | r13/f | 2.23 | 1.20 | 1.14 | 1.14 | 1.14 |
| (6) | vd4 | 19.24 | 19.24 | 19.24 | 19.24 | 19.24 |
| (7) | vd6 | 28.36 | 28.36 | 28.36 | 28.36 | 28.36 |
| (8) | (vd2/vd4) × (vd5/vd6) | 5.68 | 5.68 | 5.68 | 5.68 | 5.68 |
| (9) | r3/f | 3.97 | 3.19 | 3.29 | 3.10 | 3.29 |
| (10) | r4/f | −0.87 | −1.01 | −0.91 | −0.91 | −0.91 |
| (11) | r5/f | −1.57 | −1.64 | −1.82 | −1.68 | −1.83 |
| (12) | |r6|/f | 17.07 | 20.01 | 15.95 | 18.71 | 15.64 |
| (13) | r7/f | −1.05 | −3.21 | −1.19 | −1.13 | −1.19 |
| (14) | r8/f | −0.93 | −1.82 | −1.13 | −1.01 | −1.13 |
| (15) | |r9|/f | 6.81 | 3.40 | 2.37 | 2.67 | 2.37 |
| (16) | |r10|/f | 4.89 | 7.48 | 5.44 | 5.37 | 5.40 |
| (17) | r12/f | 1.30 | 1.15 | 1.11 | 1.11 | 1.11 |
| (18) | |r6|/r7 | −16.20 | −6.23 | −13.44 | −16.62 | −13.14 |
| (19) | r12/r13 | 0.58 | 0.96 | 0.98 | 0.98 | 0.98 |
| (20) | r13/f7 | −2.21 | −1.15 | −1.08 | −1.08 | −1.08 |
| (21) | f2/D2 | 12.48 | 13.12 | 12.27 | 12.09 | 12.28 |
| (22) | f5/f7 | −5.28 | −11.12 | −7.36 | −9.29 | −7.39 |
| (23) | f4/f5/f7 | −0.25 | −0.07 | −0.39 | −0.16 | −0.38 |
| (24) | |f6|/f | 6.07 | 46.27 | 322.35 | 302.50 | 323.22 |

L5: fifth lens
L6: sixth lens
L7: seventh lens
IR: filter
IMG: imaging plane

What is claimed is:

1. An imaging lens comprising, in order from an object side to an image side,
    a first lens with positive refractive power,
    a second lens with positive refractive power,
    a third lens with negative refractive power,
    a fourth lens with positive refractive power,
    a fifth lens with positive refractive power,
    a sixth lens, and
    a seventh lens with negative refractive power,
wherein said first lens has an object-side surface being convex in a paraxial region, said second lens has an image-side surface being convex in a paraxial region, said third lens has an object-side surface being concave in a paraxial region, said fourth lens has an object-side surface being concave in a paraxial region, said sixth lens has an object-side surface being convex in a paraxial region, and said seventh lens has an image-side surface being concave in a paraxial region.

2. The imaging lens according to claim 1, wherein an object-side surface of said seventh lens is convex in a paraxial region.

3. The imaging lens according to claim 1, wherein the following conditional expression (1) is satisfied:

$$0.02 < (D6/|f6|) \times 100 < 2.55 \qquad (1)$$

where
D6: a thickness along the optical axis of the sixth lens, and
f6: a focal length of the sixth lens.

4. The imaging lens according to claim 1, wherein the following conditional expression (2) is satisfied:

$$0.50 < f1/f < 1.70 \qquad (2)$$

where
f1: a focal length of the first lens, and
f: a focal length of the overall optical system of the imaging lens.

5. The imaging lens according to claim 1, wherein the following conditional expression (3) is satisfied:

$$3.75 < f5/f < 17.50 \qquad (3)$$

where
f5: a focal length of the fifth lens, and
f: a focal length of the overall optical system of the imaging lens.

6. The imaging lens according to claim 1, wherein the following conditional expression (4) is satisfied:

$$0.20 < (f1/|f6|) \times 100 < 35.00 \qquad (4)$$

where
f1: a focal length of the first lens, and
f6: a focal length of the sixth lens.

7. The imaging lens according to claim 1, wherein the following conditional expression (5) is satisfied:

$$0.60 < r13/f < 3.50 \qquad (5)$$

where
r13: a paraxial curvature radius of an object-side surface of the seventh lens, and
f: a focal length of the overall optical system of the imaging lens.

* * * * *